(12) United States Patent
Kodorkin et al.

(10) Patent No.: US 8,365,168 B1
(45) Date of Patent: Jan. 29, 2013

(54) METHOD AND SYSTEM FOR PROCESSING ISOCHRONOUS DATA PACKETS USING VIRTUAL USB CONTROLLER, AND PLACING THE ISOCHRONOUS DATA PACKETS INTO A LOOK-AHEAD QUEUE HAVING A PLURALITY OF BLANK PACKETS

(75) Inventors: Alexander V. Kodorkin, Moscow (RU); Dmitry A. Nesterenko, Moscow (RU); Nikolay N. Dobrovolskiy, Moscow (RU); Alexander G. Tormasov, Moscow (RU); Andrey A. Omelyanchuk, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 1239 days.

(21) Appl. No.: 12/169,475

(22) Filed: Jul. 8, 2008

Related U.S. Application Data

(60) Provisional application No. 60/948,655, filed on Jul. 9, 2007.

(51) Int. Cl.
*G06F 9/455* (2006.01)
(52) U.S. Cl. .......................................................... 718/1
(58) Field of Classification Search ........................ 718/1
See application file for complete search history.

(56) References Cited

U.S. PATENT DOCUMENTS

| | | | |
|---|---|---|---|
| 6,339,584 B1 * | 1/2002 | Gross et al. | 370/225 |
| 7,111,086 B1 * | 9/2006 | Ecoleston et al. | 710/33 |
| 7,478,180 B1 * | 1/2009 | Li | 710/62 |
| 2007/0040834 A1 * | 2/2007 | Panesar et al. | 345/440 |
| 2009/0006702 A1 * | 1/2009 | Sarangdhar et al. | 710/305 |

* cited by examiner

*Primary Examiner* — Thomas Lee
*Assistant Examiner* — Xuxing Chen
(74) *Attorney, Agent, or Firm* — Bardmesser Law Group

(57) ABSTRACT

A method, system and a computer program product for processing isochronous data packets in a guest memory of a Virtual Machine (VM) using a virtual USB controller. The virtual USB controller is implemented as a software application running on computer system where the VM is implemented. The virtual USB controller is a software component emulating a physical USB controller. The virtual controller uses chains of isochronous packets processed and stored in the guest memory of the VM. Processing of the isochronous data packets includes allocating a buffer in the guest memory for each isochronous data packet and writing the isochronous data packet to the buffer. According to the proposed method, each VM has its own virtual USB controller. The method allows a number of the VMs implemented on a host operating system of a physical machine to concurrently receive data from various USB end-points by employing the virtual USB controllers.

16 Claims, 6 Drawing Sheets

METHOD AND SYSTEM FOR PROCESSING ISOCHRONOUS DATA PACKETS USING VIRTUAL USB CONTROLLER, AND PLACING THE ISOCHRONOUS DATA PACKETS INTO A LOOK-AHEAD QUEUE HAVING A PLURALITY OF BLANK PACKETS

BACKGROUND OF THE INVENTION

1. Field of the Invention

The present invention relates generally to Virtual Machine (VM) technology and, more particularly, to a method and system for processing isochronous data packets in a guest memory of a VM using virtual USB controller.

2. Background Art

In the past decade, capabilities of computer systems have increased significantly. Computer systems process large volumes of packet data including voice and video data. Typically, voice and video data comes in isochronous (live) mode in a form of a continuous stream of packets. Asynchronous Transfer Mode (ATM) is a type of packet switching that uses small packets (53 bytes) called "cells." In an isochronous communication, ATM device gathers voice or video into small packets or cells and presents them to users over a network.

The ATM technology is particularly well suited for communications among computers over the Internet, because of the flexibility and recoverability provided by this packet-based approach. The ATM is a network based protocol that cannot be employed directly between a stand alone computer and a peripheral device.

The ATM limitations are solved by a conventional method of using ATM data communications via a Universal Serial Bus (USB) peripheral device. This arrangement increases transmission rate and flexibility of communications between a USB host and a peripheral. The USB is a technology established by a joint effort of various companies, resulting in an adopted standard set forth in Universal Serial Bus Specification, Revision 1.1, Sep. 23, 1998 and Revision 2.0, Apr. 27, 2000. The USB Specification is directed to improving a user-friendliness of various aspects of computers and peripheral devices, and to this end, governs many aspects of USB systems. In a USB system, peripheral devices are coupled to a host computer in a tiered-star topology over the USB bus.

The USB technology provides significant advantages to a computer system user, including the ability to connect up to 127 peripheral devices, in a "daisy-chain" tiered-star topology, to a single USB port on the host computer. USB systems also can easily integrate various functions such as data, voice, and video, into a system through a single serial-data transfer protocol, without reliance on add-on cards and availability of their associated main board slots.

However, the conventional USB systems do not meet the needs of virtualization. Virtualization allows running a number of Virtual Machines (VMs) on the same physical machine or processor. The physical machine (i.e., work station) can employ a USB device with USB end points operated by a conventional hardware-implemented USB controller of the physical machine. However, numerous VMs simultaneously running on the host operating system of the physical machine cannot use the same physical USB controller.

Accordingly, there is a need for a method and system for processing isochronous data packets in a guest memory of a VM using software emulation of a physical USB controller (i.e., virtual USB controllers).

SUMMARY OF THE INVENTION

The present invention relates generally to Virtual Machine (VM) technology and, more particularly, to a method, system and computer program product for processing isochronous data packets in a guest memory of a VM using a virtual USB controller, that substantially obviates one or more of the disadvantages of the related art.

The proposed method allows a number of VMs implemented on a host operating system of a physical machine to receive data from various USB end-points simultaneously through the virtual USB controllers. According to the proposed method, each VM has its own virtual USB controller.

The virtual USB controller is implemented as a software application emulating a physical hardware-implemented USB controller. Packet data is written into VM guest memory and provided to the VM after synchronization and processing.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
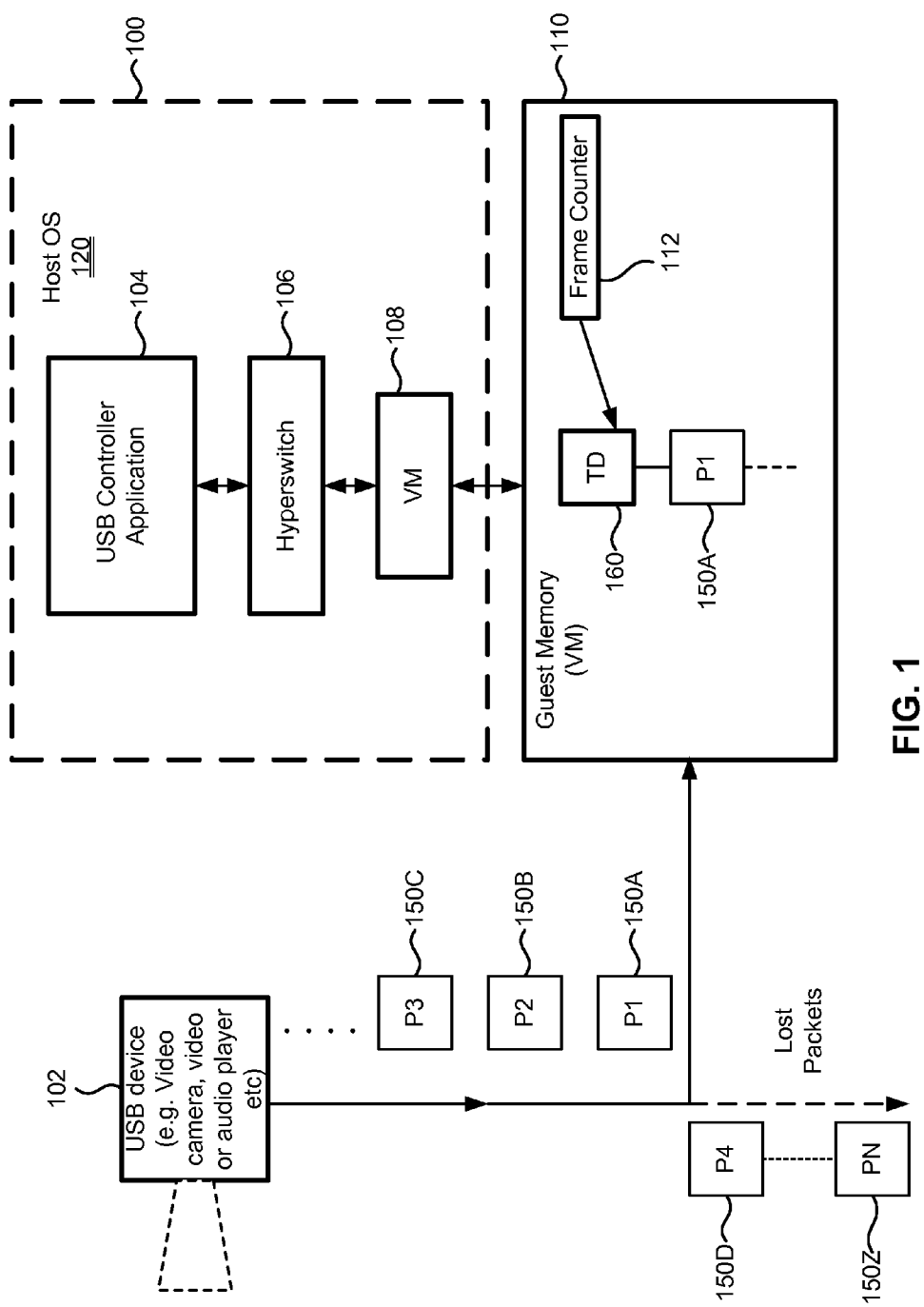
FIG. 1 illustrates an example of USB device virtualization.

Reference will now be made in detail to the embodiments of the present invention, examples of which are illustrated in the accompanying drawings.

The present invention is directed to a method and system for processing isochronous packets in a guest memory of a VM using a virtual USB controller. The proposed method allows a number of VMs implemented on a host operating system of a physical machine to receive and process isochronous data from various USB end-points through the virtual USB controllers. According to the proposed method, each VM can have its own virtual USB controller.

The preferred embodiments of the invention can be implemented by virtualization systems, where VMs have the same privilege level and share at least some system resources as it is realized, for example, in Virtuozzo™ OS virtualization solution of SWsoft.

It should be noted that the exemplary embodiment can be used for any type of virtualization systems, such as, for example, full virtualization technology, para-virtualization technology, other software-based and hardware-based virtualization technology (including Intel (VT-x) hardware virtualization technology, Itanium processor (VT-i) virtualization, AMD (AMD-V) virtualization technology, etc.). Various embodiments can be used in hypervisor-based and host-based VMM (Virtual Machine Monitor) virtualization systems, mainframe virtualization systems, hardware emulation systems, etc.

One embodiment can be implemented in a hardware system where USB device is connected to a computer system, on which a VM is implemented. In another embodiment, a USB device can be connected to a different computer system, and data, generated by a USB device, can be provided to a VM using an appropriate software/hardware-implemented transport (e.g., wired or wireless physical transmission media, software means that provide compression and decompression, etc.)

In yet another embodiment, a USB device can also be virtualized. Multiple data sets can be converted, according to software requirements, to the USB packet data stream and provided to the VM. For example, audio and/or video files can be converted into a sequence of USB packets similar to packets produces by a regular USB device. Then, a generated data stream can be played in the VM by means of a video/audio software-implemented player designed for that device.

A computer system (such as a workstation or a laptop) can receive isochronous data from USB end-points using a standard built-in hardware-based USB controller. A single VM implemented on an operating system of this work station can also receive an isochronous data through the standard USB controller. However, one of the purposes of virtualization is to create a number of VMs concurrently running on a host operating system. While each individual VM needs a USB controller, it is not practical to have a multiple hardware-based USB controllers integrated into a work station. The proposed method and system allows for multiple VMs, implemented on the same host operating system, to simultaneously receive and process isochronous data packets, by using different instances of a software component, which emulates a standard hardware-based USB controller.

A virtual USB controller is implemented as a software application emulating a physical hardware-implemented USB controller. The application emulating physical USB controller provides the same functionality to a VM as a real USB controller to a physical machine. The isochronous packet data received from a peripheral USB device is written into VM guest memory and provided to the Virtual Machine Monitor (VMM) after synchronization and processing.

An example of implementation of a virtual USB controller is illustrated in FIG. 1. The USB device 102, such as a video camera, an audio or a video player, etc., provides isochronous packets 150A-150C to a VM implemented on a host operating system 120 of a computer system 100. The isochronous packets 150A-150C are sent as a continuous stream of data at time intervals determined by length of USB frames. Voice, video and control end-points of the video camera 102 are controlled by a video controller application 104 (i.e., virtual video controller) executed on the host operating system 120.

The video controller application 104 emulates a physical USB video controller for a VM 108 having a VMM implemented on the host operating system 120. The VMM of the VM 108 communicates with the video controller application 104 through a hyperswitch 106, implemented as a part of a Hypervisor (see, e.g., U.S. patent application Ser. No. 11/348, 382; Filed: Feb. 7, 2006, entitled SYSTEM AND METHOD FOR STARTING VIRTUAL MACHINE MONITOR IN COMMON WITH ALREADY INSTALLED OPERATING SYSTEM, incorporated herein in its entirety).

The isochronous video data packets 150A, 150B and 150C are placed into a guest memory 110 of the VM 108 one at a time by the video controller application 104. A USB Transfer Descriptor (TD) 160 allocates memory buffer for each packet received within a USB frame. For purposes of discussion, each USB frame is viewed as a time frame for transfer of one packet. However, there can be multiple isochronous packets transferred within a frame. A frame counter 112 scans the TD 160 for frames and allocates the space in guest memory 110 for packet 150A received within the frame, and then the packet 150A is written into the memory buffer and read by the VMM of the VM 108. The same procedure is repeated for all subsequent isochronous video data packets 150B-150C, one at a time.

The implementation of the virtual video controller illustrated in FIG. 1 is limited to a certain small number of the isochronous video data packets (processed one at a time) and can only be used when a quality of a video stream received at the VMM of the VM 108 is not essential. The limitations of the virtual video controller are imposed by the video controller application 104, which cannot process more than a limited number of frames in a real time, unlike a real hardware USB controller. Thus, some of the frames containing isochronous packets 150D-150Z are lost.

Figure 2:
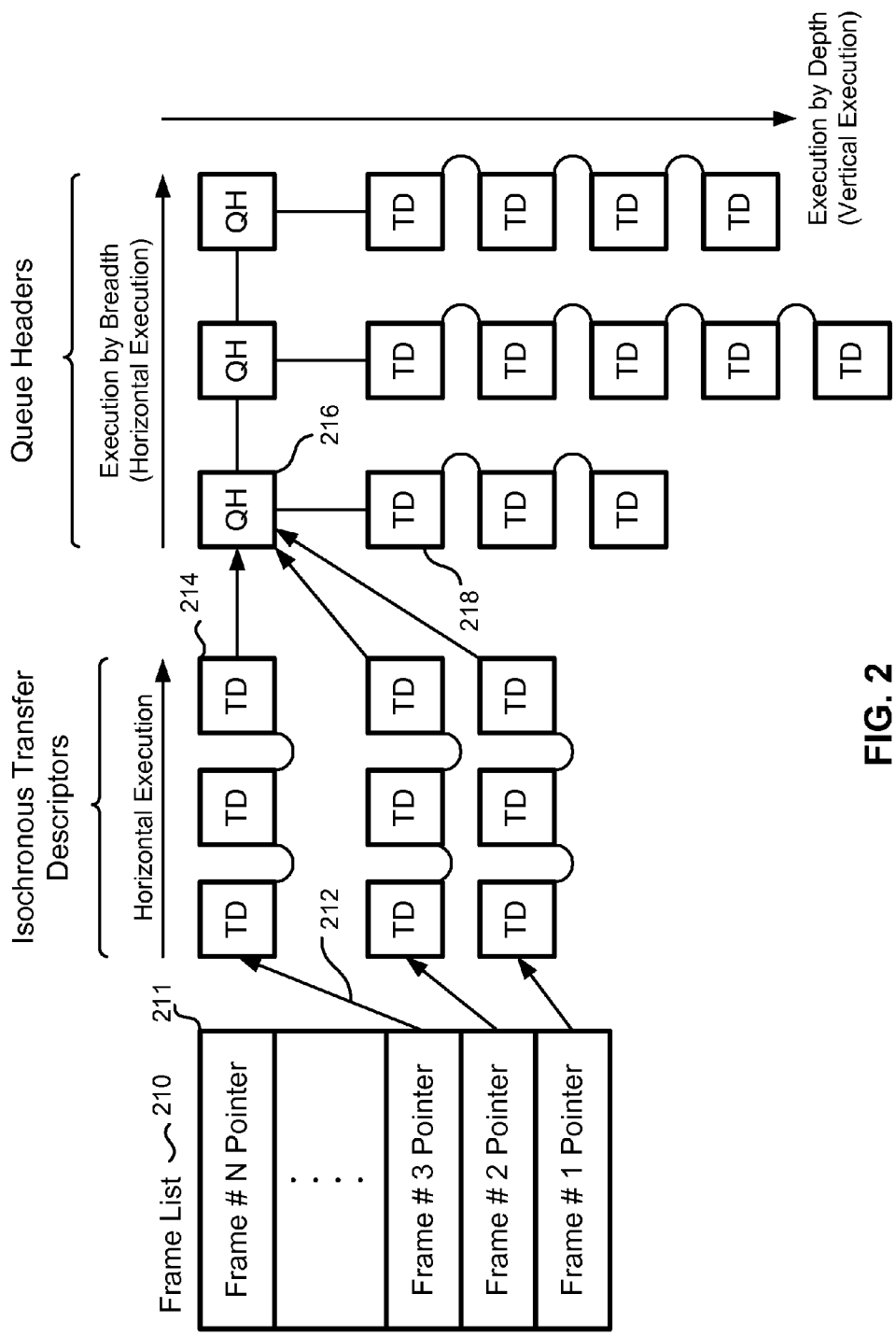
FIG. 2 illustrates a Universal Host Controller, in accordance with the exemplary embodiment.

FIG. 2 illustrates an exemplary Universal Host Controller implementation in accordance with the USB host controller standard. The USB host controller data structure includes a frame list 210, isochronous Transfer Descriptors (TD) 214 and queue headers (QH) 216. These data structures are used to schedule and process the USB transactions. The frame list 210 consists of frame pointers 211. Each pointer refers to a TD 214 or to QH 216. The link pointers 212 are used for finding the next TD 214 or QH 216 to execute.

All TDs 214 have the same structure. However, for each isochronous operation the USB host controller software component builds a separate set of TDs 214. Each TD 214 describes a particular USB packet. The TD 214 has control and status fields that contain information reflecting routing, packet data and general behavior characteristics of the USB transaction. Also, the TD 214 points to data buffers.

According to the exemplary embodiment, the USB host controller fetches the TD 214 and generates a corresponding transaction on the USB. Each isochronous TD 214 is linked to a specific point in real time. Transfer descriptors that do not result in a successfully completed transaction are not reused. The list of the transfer descriptor-defined transactions is horizontally executed until the end of the transfer descriptor list is reached. Thus, the list of TD's has two versions of traversal: Width first (Horizontal Execution), or Depth first (Vertical Execution). A flag bit in each TD controls whether traversal is Breadth or Depth first. The default mode of traversal is Width-First. For Width-First, the host controller only executes the top element from each queue. In a Depth-first traversal, if the Host controller is currently processing a queue, and the flag bit in TD is set, the Host Controller follows the TD's link pointer to the next schedule work item (as it's described in ftp:**download.intel.com/technology/usb/UHCI11D.pdf, incorporated herein by reference). The last transfer descriptor in the list can point to a queue header 216 for processing of queued transfer descriptors 218.

Figure 3:
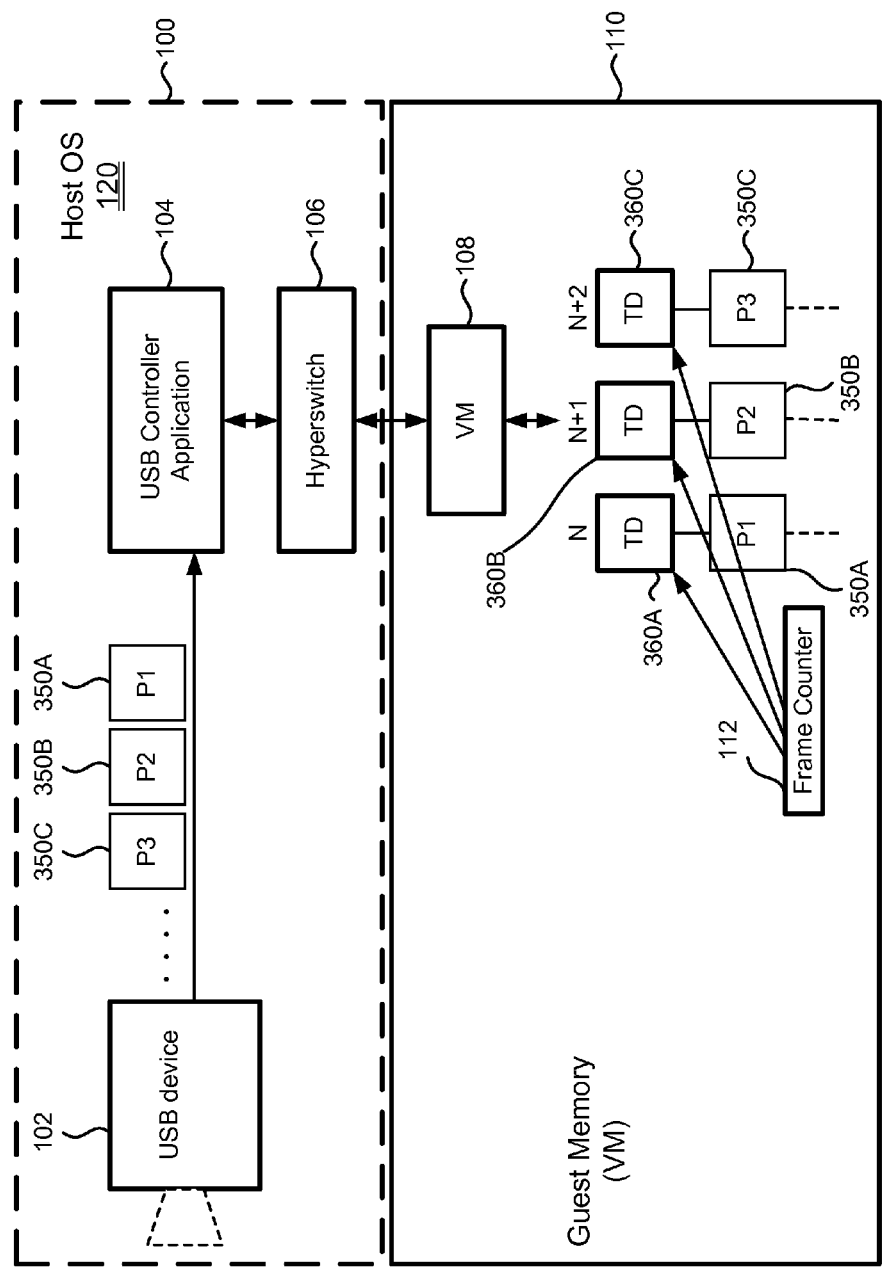
FIG. 3 illustrates a system, in accordance with the exemplary embodiment.

The limitations of a virtual USB controller depicted in FIG. 1 (i.e., loss of packets) can be overcome by another preferred embodiment illustrated in FIG. 3. The system illustrated in FIG. 3 is generally similar to the one of FIG. 1. A video camera 102 provides isochronous packets 350A-350C to a video controller application 104. Voice, video and control end-points of the video camera 102 are controlled by a video controller application 104 executed on the host operating system 120. The isochronous packets 350A-350C are sent as a continuous stream of data at time intervals determined by length of USB frames. The VMM of the VM 108 communicates with the video controller application 104 through the hyperswitch 106.

The isochronous video data packets 350A, 350B and 350C within the frames are placed into a guest memory 110 of the VM 108 by the video controller application 104 as they come. Thus, a chain of isochronous data packets 350A, 350B and 350C is created in a guest memory 110 of the VM 108. The isochronous data packets 350A, 350B and 350C are processed in order they are received. A USB TD 360A first allocates memory buffer for packet 350A received first within a USB frame N (as discussed above, herein each USB frame is viewed as a time frame for transfer of one packet).

A frame counter 112 scans the TD 360A for frames and allocates the space in guest memory 110 for packet 350A received within the frame N and then the packet 350A is written into the memory buffer and is ready to be processed by the VM 108. Meanwhile, the frame counter 112 scans the TD 360B for frames and allocates the space in guest memory 110 for packet 350B received within the frame N+1 and then the packet 350B is written into the memory buffer and is ready to be processed by the VM 108 after the previous packet is processed. The same procedure is repeated with the TD 360C for subsequent isochronous video data packet 350C received within a frame N+2.

Therefore, a chain of isochronous video data packets is created in the guest memory 110 of the VM 108. The depth of the chain is set to meet the requirements of the particular system. The processing of isochronous video data packets is synchronized in such a way that a packet received, for example, in a frame N+k is going to be processed and ready for the VM 108 exactly in k*L seconds (where L is a duration of one USB frame and k is depth to which frames are processed). In the preferred embodiment illustrated in FIG. 2, a virtual video controller for the VM 108 is implemented and no packets are lost.

Figure 4:
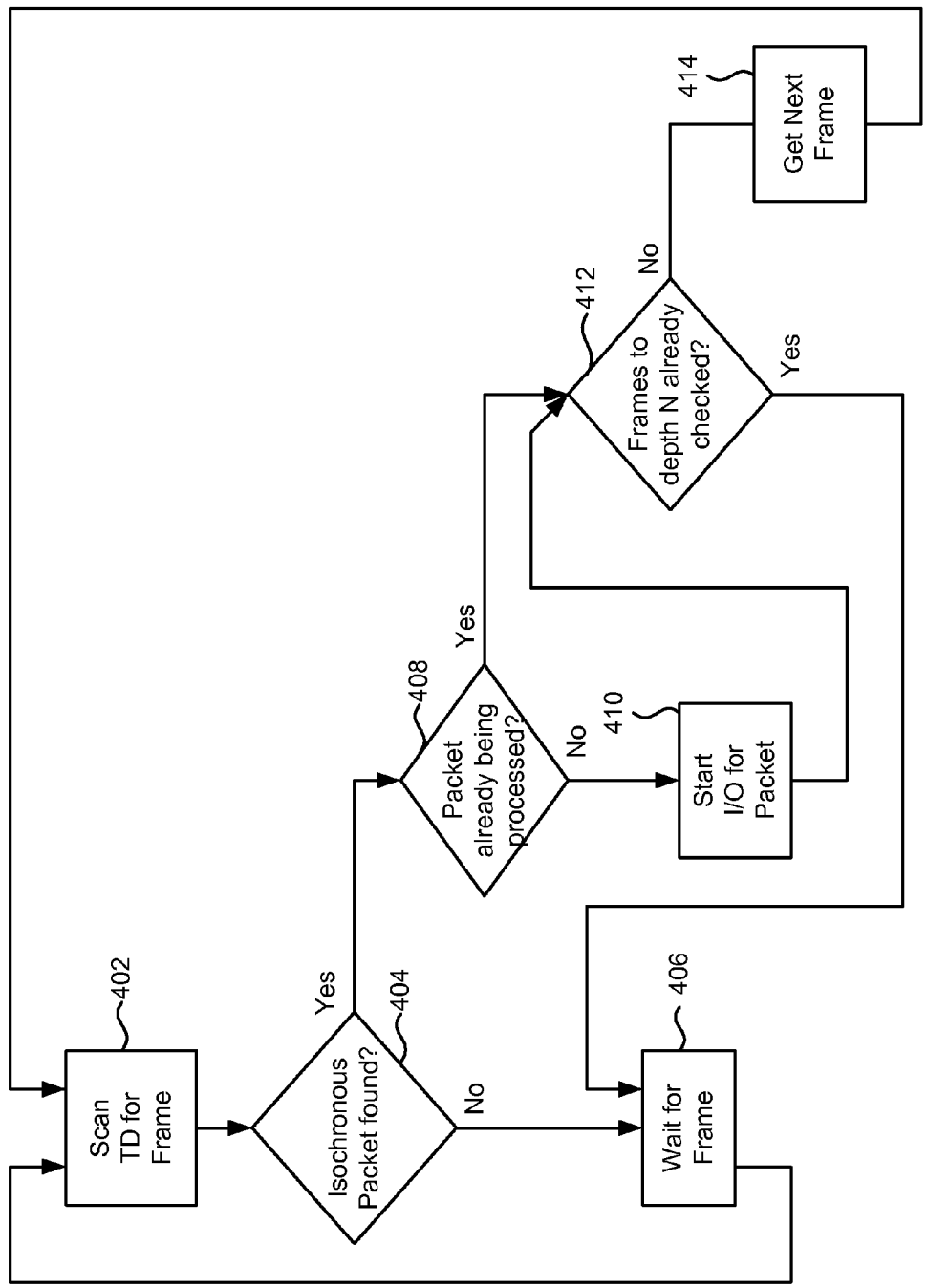
FIG. 4 illustrates a flow chart of a method, in accordance with the exemplary embodiment.

A flow chart of a proposed method (as shown in FIG. 3) is illustrated in FIG. 4. The TD is scanned by a frame counter for a frame in step 402. If an isochronous data packet is not found within the frame, the frame counter waits for a new frame (step 406). If an isochronous data packet is found within the frame, a virtual controller checks if the packet is already being processed into a guest memory of the VM (step 408). If the packet has not been processed, the virtual controller allocates the guest memory and writes the packet into the allocated memory buffer (step 410) and then checks, in step 412, if all other frames to depth N have been checked.

If the packet has been processed, then the virtual controller checks, in step 412, if all other frames to depth N have been checked. If all the frames to depth N have not been checked, than the frame counter is moved to the next frame (N+1) in step 414. If all the frames to depth N have been checked, then the controller waits for a new frame in step 406.

Figure 5:
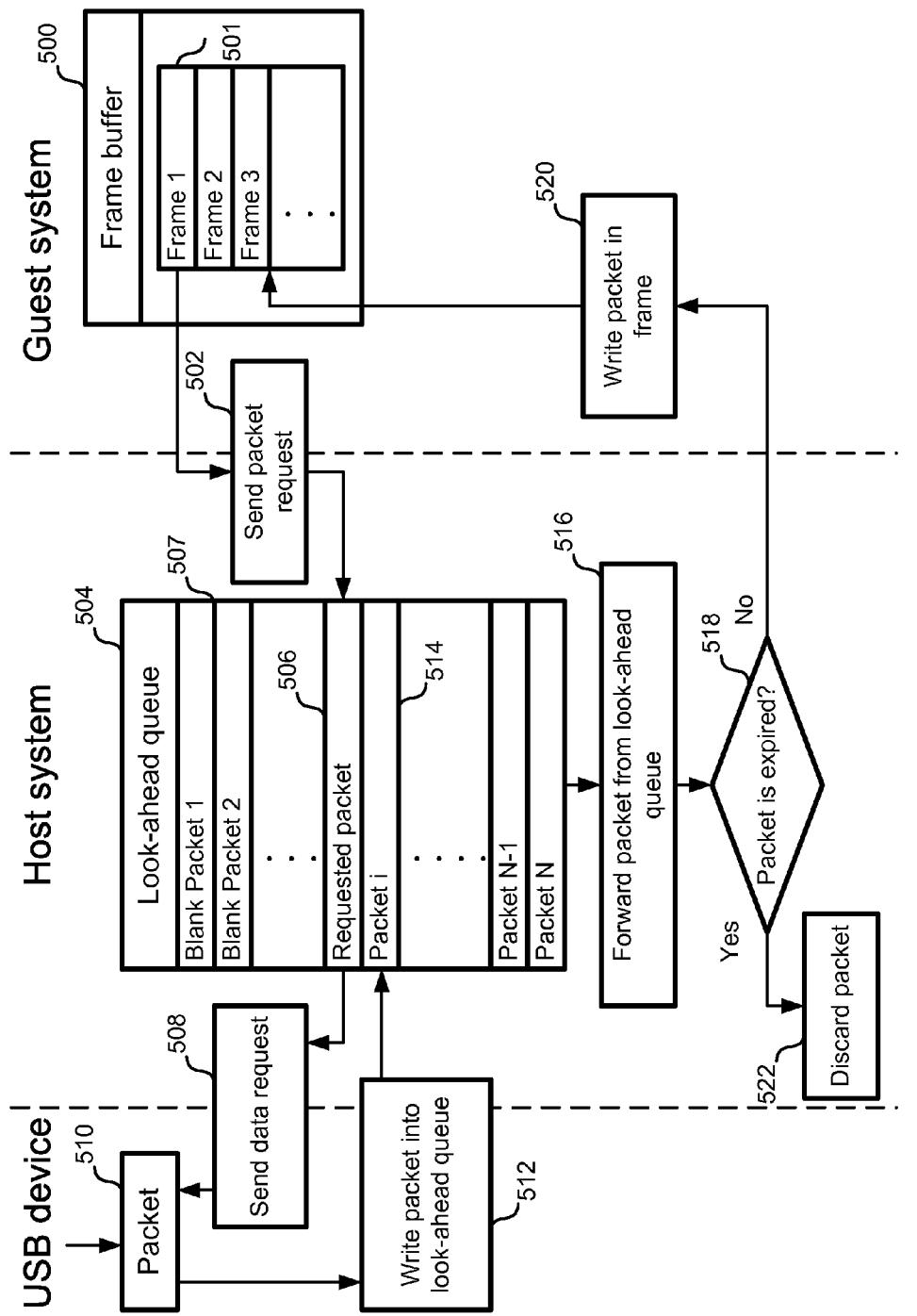
FIG. 5 illustrates a flow of isochronous packets, in accordance with the exemplary embodiment.

A flow of isochronous packets, in accordance with the exemplary embodiment, is illustrated in FIG. 5. Look-ahead queue 504 is created only once prior to processing isochronous packets 510. Then, the look-ahead queue 504 is adjusted according to parameters of incoming isochronous packets 510. The look-ahead queue 504 contains a certain number of blank packets 507. An estimation of a number of packets in the look-ahead queue 504 can be done based on various criteria, such as, for example packet execution time and reliability of a data connection.

A blank packet 507, according to the exemplary embodiment, is a packet that contains only fields defining a size and a structure of an isochronous packet 510. Some fields of a blank pocket 507 can contain default data (such as, for example, packet size and endpoint address). In other words, only the fields needed for placing the packet 510 into the look-ahead queue 504 and allocating memory a frame buffer 500, are defined.

A packet 514, according to the exemplary embodiment, is a packet that has its fields filled with data according to the incoming isochronous packet 510.

A requested packet 506, according to the exemplary embodiment, is a packet with the fields that are filled out according to the requested isochronous packet 510. It is a packet that has been moved to the look-ahead queue from the frame 501 of the frame buffer 500. The requested packet 506 contains readable data.

According to the exemplary embodiment, a data stream is divided into frames. Each frame is received by the VM. Thus, a queue consisting of frames is created. A frame queue in a guest memory is placed in the frame buffer 500. A current frame 501 is analyzed and a corresponding isochronous packet is determined. Then, a packet request 502 is sent to the look-ahead queue 504 located in the host operating system.

Note that only TD packets (i.e., isochronous packets) are selected from the frame buffer 500. Each TD packet consists of a header and a data buffer. A header contains readable data such as a destination address, a source address, packet size, routing data, etc. Initially, when the header is read, the buffer is empty. When the request 502 for transferring a packet from the frame buffer 500 into the look-ahead queue 504 is made, switching of the contexts is needed, since the frame buffer 500 can exist in different VM's. The context switching can be performed by a Virtual Machine Monitor (VMM).

The packet request 502 is placed into the look-ahead queue 504. Then, a data request 508 is formed based on a packet header. The packet header is sent to a USB device. The USB device determines, based on the packet header data, that it is a request for data transfer. At this point the buffer of the packet is empty. The buffer is filled with data only after the USB device provides the appropriate data. The packet header contains some packet identification data. As soon as the buffer of the data packet is filled with data, the changes in the particular fields of the header are made. These fields indicate that this isochronous packet changes it status from a sent packet to a received packet.

Thus, the VM exchanges information about parameters of the received packets with the USB device. The look-ahead queue 504, containing USB requests, is formed inside the host operating system. After the USB device provides data, the blank packet 514 is filled with requested data (see block 512) and placed in line for execution. Then, the packet 514 is sent for execution in the VM (see block 516). If the time for packet execution is over (see block 518), the packet is discarded at block 522. Otherwise, the packet is placed into the frame buffer 500 (see block 520) for execution in the VM.

Figure 6:
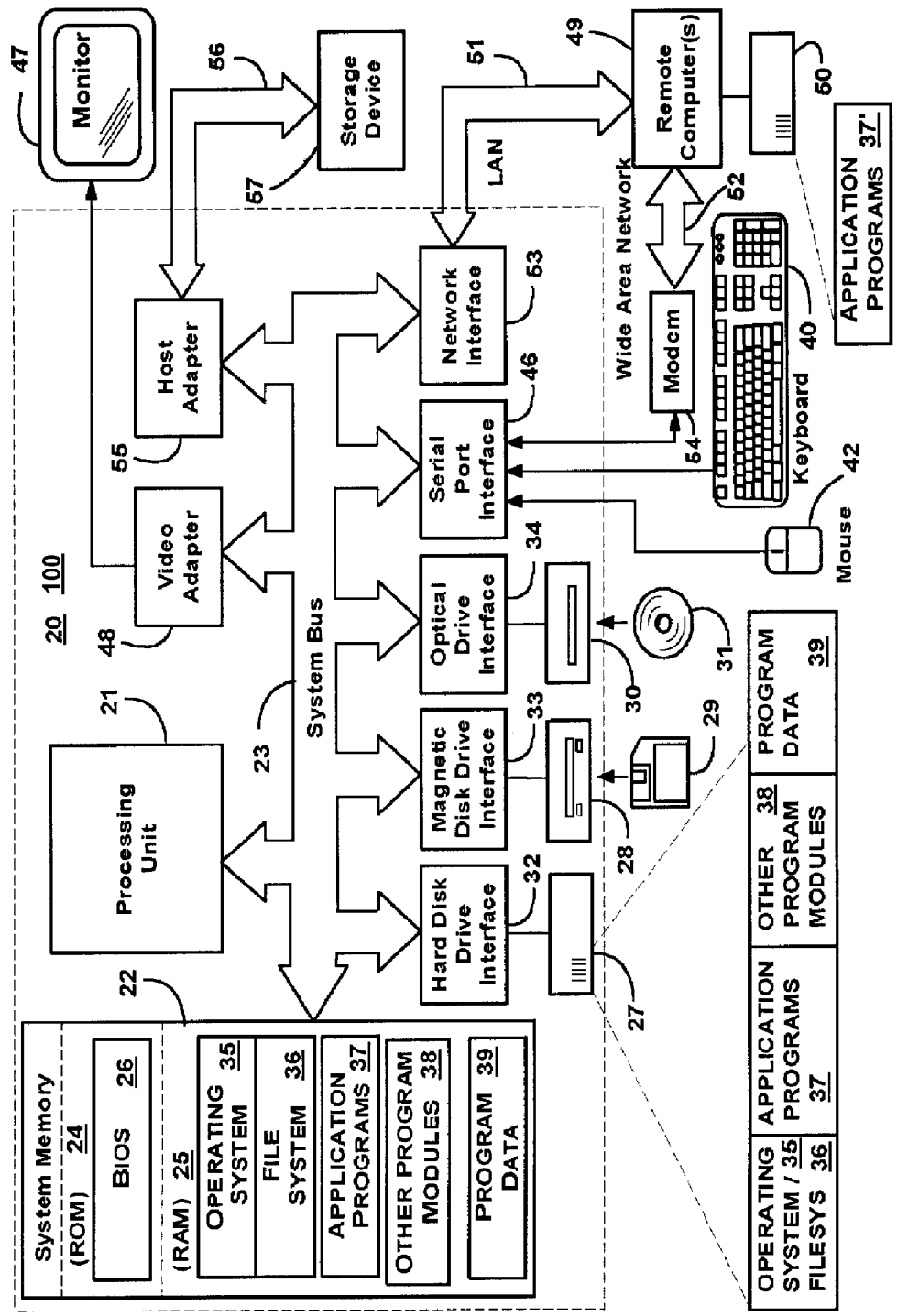
FIG. 6 illustrates an exemplary computer system on which the invention can be implemented.

With reference to FIG. 6, an exemplary computer system for implementing the invention includes a general purpose computing device in the form of a user-side computer and/or server-side computer 100 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 100, such as during start-up, is stored in ROM 24. The computer 100 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 100. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 100 includes a file system 36 associated with or included within the operating system 35, such as the Windows NT™ File System (NTFS), one or more application programs 37, other program modules 38 and program data 39. A user may enter commands and information into the computer 100 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 100 is connected to the local network 51 through a network interface or adapter 53. When used in a WAN networking environment, the computer 100 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 100, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and system have been achieved. In particular, it should be appreciated by those skilled in the art that system and method described in the preferred embodiment allows numerous VMs, implemented on the same computer system, concurrently receive and process data from peripheral USB devices.

It should also be appreciated that various modifications, adaptations, and alternative embodiments thereof may be made within the scope and spirit of the present invention. The invention is further defined by the following claims.

What is claimed is:

1. A method for processing isochronous data packets using a virtual USB controller, the method comprising:
   activating a Virtual Machine (VM) on a computer;
   instantiating a USB controller application in a host operating system of the computer;
   receiving the isochronous data packets from a USB device, the isochronous data packets including continuous and periodic data;
   placing the packets into a look-ahead queue, wherein the look-ahead queue includes a plurality of blank packets, and wherein the blank packets are configured to maintain consistent timing of the look-ahead queue;
   processing, by the USB controller application, the isochronous data packets in a guest memory of the VM, such that if a time for packet execution is over, the packet is discarded,
   wherein the processing of the isochronous data packets includes allocating a buffer in the guest memory for each isochronous data packet and writing the isochronous data packet to the buffer; and
   providing the isochronous data packets to the VM.

2. The method of claim 1, further comprising:
   activating a plurality of VMs connected to a plurality of USB devices, wherein each USB device generates the isochronous data packets received by the USB controller application according to a queue;
   forming a plurality of requests for receiving data from the USB devices, wherein each request is placed in the queue;
   generating an input request for transmitting the isochronous data packets to the VMs; and
   isochronously writing the isochronous data packets into a buffer.

3. The method of claim 1, wherein the USB controller application emulates a USB controller of the computer.

4. The method of claim 1, wherein a predetermined number of the isochronous data packets are written into the guest memory and each packet is provided to the VM in an order it was received.

5. The method of claim 1, wherein the isochronous data packets provided to the VM are synchronized according to intervals between the isochronous data packets.

6. The method of claim 1, wherein the USB controller application is a video controller application.

7. The method of claim 1, wherein the USB controller application is an audio controller application.

8. A non-transitory computer useable storage medium having computer executable program logic stored thereon for executing on the processor for implementing the method of claim 1.

9. A system for processing isochronous data packets using a virtual USB controller, the system comprising:
   a Virtual Machine (VM) activated on a host operating system of a computer;
   a Virtual Machine Monitor (VMM);

a USB controller component connected to the VMM, wherein the VMM is coupled to a guest memory of the computer system;

a look-ahead queue into which the isochronous data packets are placed, wherein the look-ahead queue includes a plurality of blank packets, and wherein the blank packets are configured to maintain consistent timing of the look-ahead queue; and wherein the isochronous data packets are processed, by the USB controller component, in the guest memory of the VM and subsequently provided to the VM, such that if a time for packet execution is over, the packet is discarded, and wherein the isochronous data packets include continuous and periodic data.

10. The system of claim 9, wherein the VMM is coupled to the USB controller component via a hyperswitch.

11. The system of claim 9, wherein the USB controller component is an emulation of a USB controller of the computer.

12. The system of claim 9, wherein processing of the isochronous data packets includes filling a buffer of the isochronous data packet with data.

13. The system of claim 9, wherein the isochronous data packets provided to the VM are synchronized according to time intervals between the isochronous data packets.

14. The system of claim 9, wherein the USB controller component is a video controller application.

15. The system of claim 9, wherein the USB controller component is an audio controller application.

16. The system of claim 9, wherein the isochronous data packets are processed by allocating a buffer in the guest memory for each isochronous data packet and writing the isochronous data packet to the buffer.

* * * * *